United States Patent [19]

Chen, Sr. et al.

[11] Patent Number: 5,173,541
[45] Date of Patent: Dec. 22, 1992

[54] MUCONIC ACID GRAFTED POLYOLEFIN COMPATIBILIZERS

[75] Inventors: Paul N. Chen, Sr., Gillette; Morton M. Glick, Summit; Michael M. Jaffe, Maplewood; Alex Forschirm, Parsippany, all of N.J.

[73] Assignee: Hoechst Celanese Corp., Somerville, Del.

[21] Appl. No.: 622,563

[22] Filed: Dec. 5, 1990

[51] Int. Cl.$^5$ .................. C08F 265/02; C08F 267/02
[52] U.S. Cl. ..................................... 525/301; 525/154
[58] Field of Search ............................................. 525/301

[56] References Cited

U.S. PATENT DOCUMENTS 5,070,144 12/1991 Chen et al. ...................... 525/154

Primary Examiner—Maurice J. Welsh
Assistant Examiner—Rachel Johnson
Attorney, Agent, or Firm—Joseph M. Mazzarese

[57] ABSTRACT

A graft copolymer having a polyolefinic main chain with muconic acid groups pendant therefrom. The acid groups are bonded to the backbone of the polyolefin by free radical addition across a muconic acid double bond. Preferably, the copolymer is prepared via a reactive extrusion process. The copolymer's applications include use as a reactive compatibilizer for polymer blends. The preferred polyolefin is polypropylene.

11 Claims, 2 Drawing Sheets

MUCONIC ACID GRAFTED POLYOLEFIN COMPATIBILIZERS

BACKGROUND OF THE INVENTION

The present invention relates to the field of polymers and polymer blends. The invention further relates to muconic acid-containing polyolefins that may be used as compatibilizing agents.

Thermoplastic polymers individually possess properties, such as heat and chemical resistance, impact resistance, stiffness, strength, and the like, that vary greatly from one polymer to another. For some applications a single polymer may be quite satisfactory. However, in certain situations it is desirable to have a plastic that has a combination of properties not found in any single polymer; in such cases, polymer blends are often used to obtain the benefit of the properties of more than one polymer. Unfortunately, polymers typically do not adhere to each other well, so that polymers that one may wish to blend together may not be compatible. For this reason, compatibilizers are used. Useful compatibilizers include copolymers in which one part of the polymer molecule is compatible with one polymer and another part is compatible with a dissimilar polymer. When the compatibilizer is mixed with these dissimilar polymers a compatible blend may be formed. In the case of a reactive compatibilizer, the compatibilizer forms bonds with one or more of the polymers. Block and graft copolymers are often used as compatibilizers. See, e.g., U.S. Pat. Nos. 3,483,273, 3,860,442, 4,081,424, 4,107,130, and 4,110,303, the disclosures of which are herein incorporated by reference.

Polyolefins having functional monomers grafted thereon are known in the art. Acrylic acid grafted polypropylene, for instance, is produced by BP Chemicals, which sells this polymer as part of its POLYBOND ® product line. This product is used as a reactive compatibilizer for preparing polypropylene-polyester and polypropylene-nylon blends. However, acrylic acid grafting causes polyolefins to degrade significantly, reducing the intrinsic viscosity, molecular weight, and other properties of the polymer; furthermore, the active surface area of the product copolymer is relatively low. Graft copolymers of this type are disclosed in U.S. Pat. Nos. 4,455,273 and 4,584,347, the disclosures of which are herein incorporated by reference.

Maleic anhydride grafted polyolefins are also available from BP Chemicals under the POLYBOND ® tradename. However, these polymers are less effective compatibilizers than the acrylic acid graft copolymers for some applications. Furthermore, polyolefin degradation is a significant problem with these graft copolymers, as well.

Muconic acid, also known as 2,4-hexadienedioic acid, has the chemical formula HOOC—CH=CH—CH=CH—COOH. Cis,cis-and cis,trans-muconic acid are presently available from Celgene Corporation. Due to its double bonds and diacid functionality, muconic acid can undergo a wide variety of reactions. Many muconic acid derivatives are known, including lactones, sulfones, polyamides, polyesters, thioesters, addition polymers, and other compounds. Such compounds have a wide variety of uses, including use as surfactants, flame retardants, UV light stabilizers, thermoset plastics, thermoplastics and coatings.

SUMMARY OF THE INVENTION

The present invention is a graft copolymer comprising a polyolefin backbone or main chain, preferably polypropylene, having muconic acid groups pendant therefrom. The acid groups are bonded to the backbone of the polyolefin by free radical addition across a muconic acid double bond. Preferably, the copolymer is prepared via a reactive extrusion process. The copolymer's applications include use as a reactive compatibilizer for polymer blends.

It is an object of the present invention to provide a novel composition comprising muconic acid units grafted onto a polyolefin backbone.

It is another object of the present invention to provide a new compatibilizer for polymer blends.

These and other objects of the present invention will be apparent to those skilled in the art from the foregoing, the following description, and the appended claims.

DETAILED DESCRIPTION OF THE PREFERRED EMBODIMENTS

Figure 1:
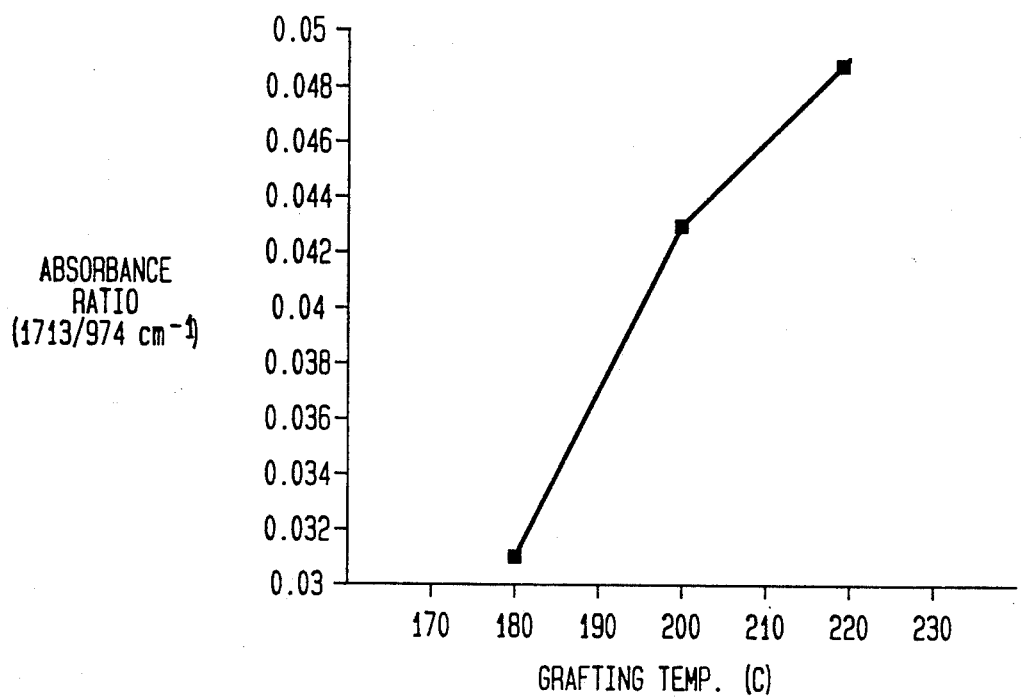
FIG. 1 shows the infrared absorbance ratio of the COOH band at 1713 cm$^{-1}$ to the polypropylene band at 974 cm$^{-1}$ for three copolymers according to the present invention.

In one aspect of the invention, a polyolefin is melt extruded with muconic acid at a temperature in the approximate range of 160°–240° C. to produce a graft copolymer. Preferably, the temperature is between about 180° C. and 220° C.

Known methods other than melt extrusion may also be used. One may employ any technique that causes the necessary free radical addition reaction between the muconic acid and the polyolefin.

The polyolefin starting material may be thought of as a continuous chain of carbon atoms having two atoms or groups of atoms as side groups bonded to each carbon atom. In the case of polypropylene, essentially all the side groups are hydrogen atoms except one methyl group on every second carbon atom: (—CH$_2$—CH(—CH$_3$)—)$_a$. Muconic acid has the chemical formula HOOC—CH=CH—CH=CH—COOH. When polyolefin and muconic acid are mixed and free radical addition is initiated a hydrogen atom on a polyolefin carbon atom (either on the main chain or on a side group) is replaced by a muconic acid side group; the muconic acid loses one of its double bonds as one of its carbon atoms bonds to the polyolefin carbon atom in place of the lost hydrogen and the muconic acid side group picks up another hydrogen atom. For example, muconic acid grafted polypropylene may have repeat units such as:

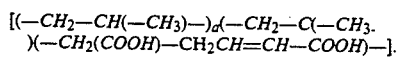

This formula is presented for the purpose of illustration; the graft bonding may involve other sites on the main chain, and/or other muconic acid carbon atoms.

A polyolefin especially preferred in the practice of this invention is polypropylene. Other preferred polyolefins include polyethylene, polybutylenes, and the like. The choice of the polyolefin is not crucial with regard to the formation of a muconic acid graft copolymer; one may use any polyolefin that will react with muconic acid to a significant degree and remain stable under the reaction conditions. However, it will be understood that the properties of the copolymer will vary depending on the choice of starting material.

The muconic acid content of the product copolymer is dependent on the concentration of muconic acid in the starting material and the reaction conditions, e.g. temperature. The grafting efficiency tends to increase with an increase in the grafting reaction temperature. The final product may have anywhere from zero to about 5.0% muconic acid content; preferably, the muconic acid content is in the approximate range of 0.2% to 2.0%. Most preferably, the muconic acid content is in the approximate range of 0.5% to 1.0%.

The intrinsic viscosity ("IV") of a polymer is commonly used as an indication of its molecular weight. The IV of the muconic acid-containing polyolefin of this invention will depend upon the IV of the polyolefin starting material and the degree of polymer degradation during the grafting process.

The inventors have found surprisingly little polymer degradation during muconic acid grafting compared to the known degradation produced by grafting acrylic acid and other units onto polyolefins. The relatively high IV of the muconic acid-polyolefin copolymers of the present invention suggests that these copolymers will have certain advantages over lower IV acrylic acid grafted copolymers; under the same grafting conditions muconic acid grafted copolymer exhibits enhanced properties such as those illustrated in Example II, below. Additionally, the muconic acid group itself may have special advantages in the reactive compatibilization of certain polymers due to its particular chemical properties compared to other functional groups.

The following Examples are presented as an illustration of one embodiment of the present invention:

EXAMPLE I

A Haake Buchler Instru., Inc. System 90 Melt Mixer was used to mix together the following ingredients:
1) 97.9% polypropylene (HIMONT 6523)
2) 2.0% cis,cis-muconic acid (CELGENE)
3) 0.1% Lupersol 130 (AUTOCHEM), an organic peroxide free radical initiator containing 2,4-dimethyl-2,5-di(tert-butyl-peroxy)-3-hexyne.

Three runs were performed, each at a different mixing temperature: 180° C., 200°, and 220° C. The melt mixer was run at 100 rpm for 5 minutes in each run. Films were made from the polypropylene starting material and from the three copolymers by calendering at 200° C. and 1000 psi. Residual ungrafted muconic acid was removed from the films via overnight methanol extraction. The acid content of the extracted films made at 180° C., 200° C., and 220° C. was measured by titration and found to be 0.3%, 0.5%, and 0.6%, respectively.

FIG. 1 shows the infrared absorbance ratio of the COOH band at 1713 cm$^{-1}$ to the polypropylene band at 974 cm$^{-1}$ for the three methanol extracted copolymer films produced in this experiment. These results illustrate the effect of melt mixing temperature on grafting efficiency; the higher ratios for products made by higher temperature grafting indicate greater grafting efficiency, i.e. the product copolymer contains more muconic acid groups.

Figure 2:
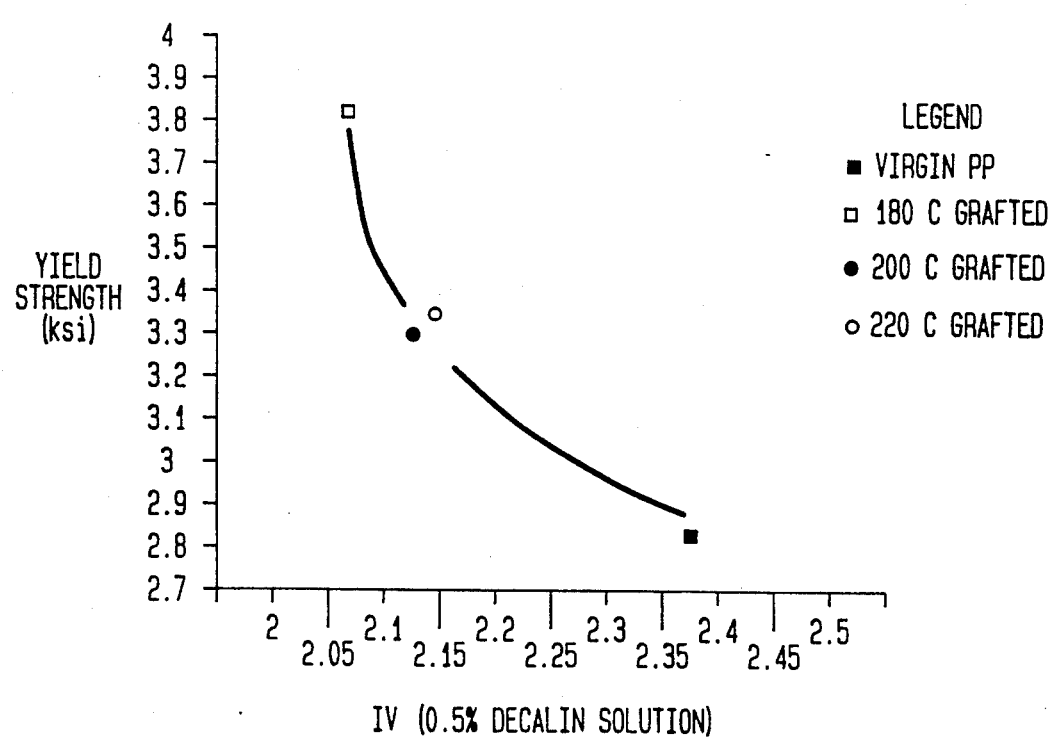
FIG. 2 plots the intrinsic viscosity (0.5% Decalin solution) and film yield strength (ksi) of polypropylene and three muconic acid-polypropylene graft copolymers according to the present invention.

FIG. 2 presents the results of IV (0.5% Decalin solution) and film yield strength (ksi) measurements on each copolymer and on the polypropylene starting material. The yield strengths were measured at an elongation of 200%. The copolymer films have higher yield strengths than the virgin polypropylene film, but the IV's are lower for these copolymers. The lowest IV and the highest yield strength are exhibited in the 180° C. graft copolymer; the two graft copolymers produced at the higher temperatures have similar IV's and strengths. The IV of each graft copolymer is only about 10–13% below that of the polypropylene starting material.

Figure 3:
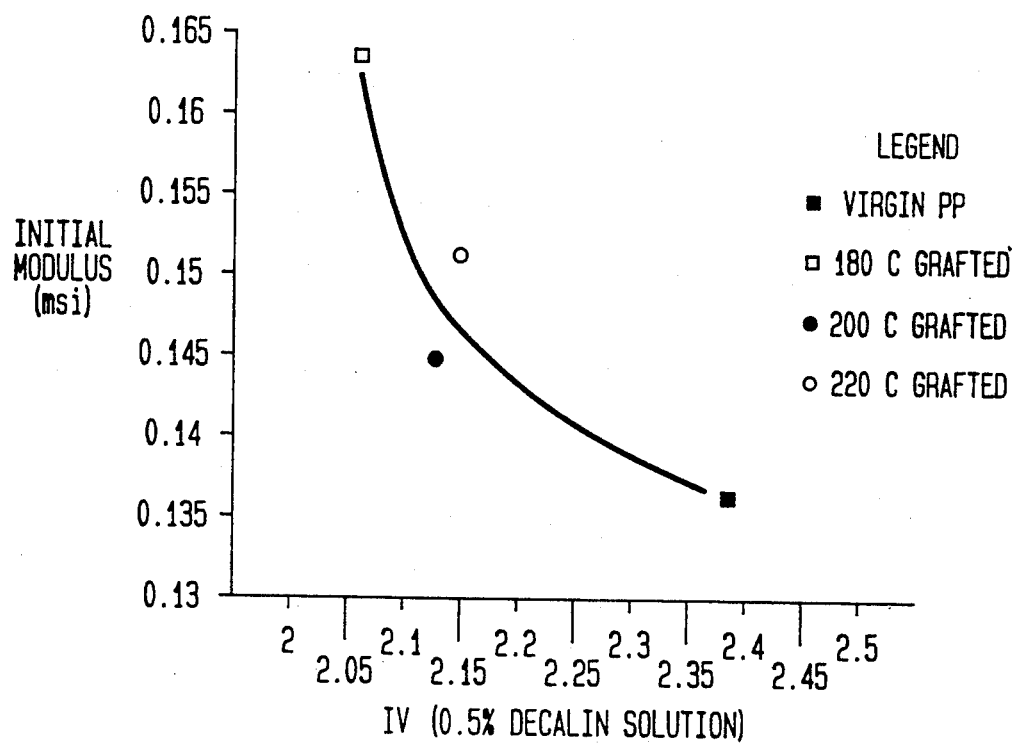
FIG. 3 shows the relationship between the IV and the initial modulus (msi) for films of the polymers of FIG. 2.

FIG. 3 shows the relationship between the IV and the initial modulus (msi) for films of these polymers. The initial modulus was measured at 200% elongation. The modulus is highest for the 180° C. graft copolymer; the second highest modulus is that of the 220° C. graft copolymer.

The overall results indicated that the muconic acid grated copolymers have surprising IV and property relationships, e.g., IV decreased after grafting while strength and modulus increased. These results suggest the possibility that some cross-linkages may form during grafting.

EXAMPLE II

The three runs in Example I were duplicated with acrylic acid substituted for the muconic acid. The acrylic acid copolymers ("AAC"), the copolymers of Example I ("MAC") and the original polypropylene were made into films by calendering at 200° C. and 1000 psi. The properties of these films are compared in the table below:

|  |  | IV (RT) | IV loss (%) | Strength (Ksi) | Modulus (Mpi) | Elongation (%) |
|---|---|---|---|---|---|---|
| polypropylene | | 2.38 | 0 | 2.39 | 0.136 | 200+ |
| MAC: | 180° C. | 2.07 | 13.0 | 2.74 | 0.163 | 200+ |
|  | 200° C. | 2.12 | 10.9 | 2.62 | 0.144 | 200+ |
|  | 220° C. | 2.13 | 10.5 | 2.58 | 0.151 | 200+ |
| AAC: | 180° C. | 1.84 | 22.7 | 2.99 | 0.163 | 170 |
|  | 200° C. | 1.95 | 18.1 | 3.25 | 0.182 | 153 |
|  | 220° C. | 1.70 | 28.6 | 3.54 | 0.197 | 46 |

The muconic acid graft copolymers clearly exhibited greater IV retention than the acrylic acid graft copolymers. The muconic acid graft copolymers were also far more ductile.

Figure 4:
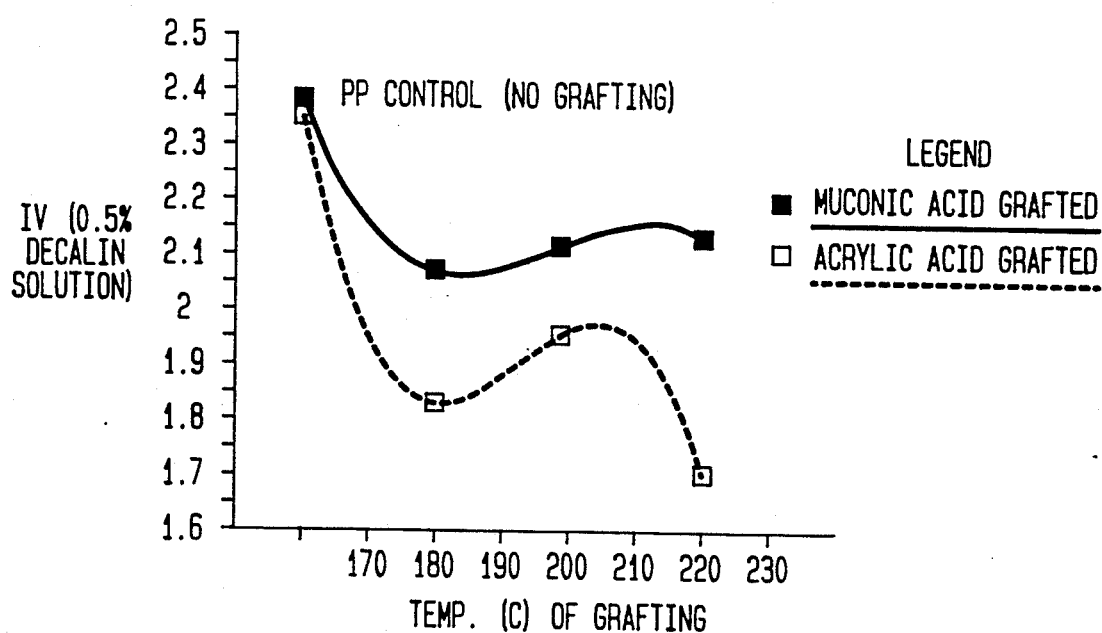
FIG. 4 shows the relationship between the grafting temperature and the IV for each polymer of FIG. 2 and for three acrylic acid-polypropylene graft copolymers.

FIG. 4 shows the relationship between the grafting temperature and the IV for each polymer in this experiment. The IV of the acrylic acid graft copolymers is significantly lower than that of the other polymers for all grafting temperatures.

Many variations of the present invention will occur to those skilled in the art upon consideration of the above disclosure and the appended Figures and claims. The scope of the invention is not limited to those embodiments illustrated or presented herein but encompasses the full subject matter within the scope of the claims.

We claim:

1. A copolymer comprising a polyolefin having muconic acid side groups.

2. A copolymer according to claim 1 wherein said muconic acid side groups comprise up to about 5% by weight of the copolymer.

3. A copolymer according to claim 1 wherein said polyolefin is polypropylene.

4. A copolymer according to claim 3 wherein said muconic acid side groups comprise up to about 5% by weight of the copolymer.

5. A copolymer according to claim 3 wherein said muconic acid side groups comprise about 0.2% to about 2.0% by weight of the copolymer.

6. A copolymer comprising the product of a free radical addition reaction between a polyolefin and muconic acid.

7. A copolymer according to claim 6 wherein said polyolefin is polypropylene.

8. A copolymer according to claim 6 wherein said free radical addition reaction occurs at a temperature from about 180° C. to about 220° C.

9. A copolymer according to claim 6 wherein said copolymer has a muconic acid content of up to about 5% by weight.

10. A copolymer according to claim 6 wherein said copolymer has a muconic acid content of from about 0.2% to about 2.0% by weight.

11. A copolymer according to claim 6 wherein said copolymer has a muconic acid content of from about 0.5% to about 1.0% by weight.

* * * * *